Dec. 21, 1926.　　F. PUENTE Y PUENTE ET AL　　1,611,486
AUTOMOBILE FENDER
Filed May 11, 1926　　3 Sheets-Sheet 1

Inventors
F.P. PUENTE,
F.S. ALVAREZ,
By
Attorney

Dec. 21, 1926.                                                    1,611,486
F. PUENTE Y PUENTE ET AL
AUTOMOBILE FENDER
Filed May 11, 1926                    3 Sheets-Sheet 2

Inventors
F. P. PUENTE,
F. S. ALVAREZ,
By
Attorney

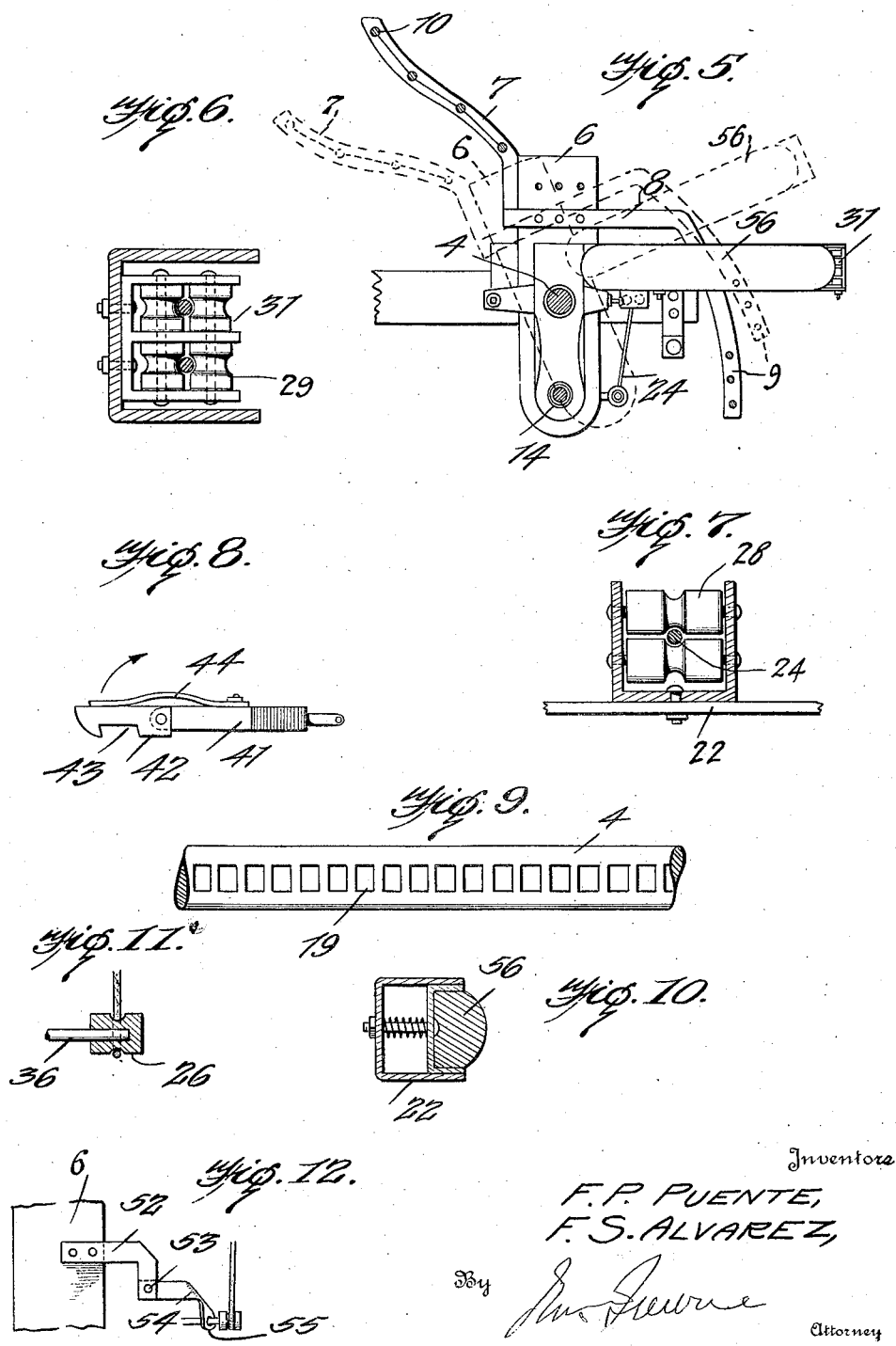

Patented Dec. 21, 1926.

1,611,486

UNITED STATES PATENT OFFICE.

FÉLIX PUENTE Y PUENTE AND FABIÁN SABUGO ALVAREZ, OF HABANA, CUBA.

AUTOMOBILE FENDER.

Application filed May 11, 1926. Serial No. 108,398.

This invention relates to fenders designed particularly for use in connection with automobiles or moving vehicles, and designed to be set in a normal position to receive a human object in the path of the vehicle and to be automatically actuated on impact to grip the object and at the same time tilt to prevent the possibility of the object falling from the fender.

The improved fender is supported from and in advance of the vehicle and includes a shaft on which frame members are mounted, connected by bars or webbing to form a supporting surface. The invention also contemplates gripping members which in normal position are supported in spaced relation against the tension of springs tending to draw said members toward each other, the structure including mechanism which under the impact of the object struck, tends to release the gripping members to the influence of said springs to thereby cause said members to approach each other with a view to gripping the object picked up by the fender and hold the same within the protective support of the fender.

The invention further includes a means for holding the fender in a normal upright position and permitting rearward tilting thereof under the weight of the object picked up, together with means for locking the fender in such tilted position, to further guard against the possibility of the object falling from the fender.

The invention is illustrated in the accompanying drawings, in which:

Fig. 5 is a longitudinal sectional view showing particularly the buffer means for the grippers.

Fig. 6 is a section on line 6—6 of Fig. 3.

Fig. 7 is a section on line 7—7 of Fig. 3.

Fig. 8 is a view of the latch for holding the gripper portions of the fender in normal or spaced relation.

Fig. 9 is a view in elevation of the supporting shaft.

Fig. 10 is a section on line 10—10 of Fig. 1.

Fig. 11 is a broken elevation, partly in section, showing the means for connecting the end of the trip cord.

Fig. 12 is a similar view showing releasing means therefor.

The fender proper is supported from the automobile or other vehicle by side bars 1, secured to an appropriate part of the automobile, preferably the frame bars of the chassis, such frame bars being in advance of the automobile projected outwardly as at 2, and then forwardly as at 3 to form supporting sections spaced apart the requisite distance for the support of the fender.

Figure 4:
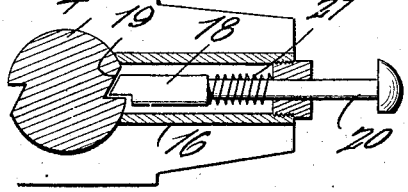
Fig. 4 is a sectional view, partly in elevation, illustrating the means for supporting the fender proper in balanced receiving position on the supporting shaft.

The fender proper is supported from a shaft 4 mounted in the sections 3 of the side bars and removably though rigidly held therein by nuts 5. The fender comprises side plates 6 rotatably supported upon the shaft 4, each plate being provided with a frame bar including a rear inclined section 7, a substantially horizontal section 8, and a downwardly curved forward section 9. These sections 7, 8, and 9, are preferably provided with connecting bars 10 extending between similar sections, and if desired, extending beyond the sections and provided with terminal nuts 11, between which and the section is arranged a coil spring 12 to afford a somewhat yielding or sliding relation between the bars and frame sections. If desired, the bars may be connected by wires, cords, or the like, indicated at 13 to provide an open work supporting section. The respective side plates 6 are thus united into a fender frame rotatably supported upon the shaft 4, and capable of tilting forwardly or backwardly relative to such shaft. The lower ends of the side plates 6 are further connected by a relatively rigid hollow shaft 14 and slidably mounted on this shaft 14 and on the shaft 4 are gripping members, comprising blocks 15 having opposite tubular projections 16 and 17, in which are slidably mounted dogs 18 adapted to engage notches 19 formed in the forward and rear portions of the shaft 4, as more particularly shown in Fig. 4. The latches 18 are mounted on rods 20, extending beyond the projections 16 for manual manipulation, the dogs being held yieldingly in engagement with the notches by springs 21. The teeth-like notches 19 are formed on the front and rear surfaces of the shaft 4 as shown in Fig. 9, and are oppositely disposed so that when the respective dogs are in cooperation with the notches, the fender as a whole is held against a forward tilting, though permitted a rearward tilting without obstruction, as will be plain from Fig. 4. The gripping members, in addition to the blocks 15, include forwardly extending bars 22 of U-shape channel form, having at their outer ends laterally and inwardly curved guard sections 23. The respective gripping members are connected by trip cords 24 and 25 terminating adjacent the respective blocks 15 in terminal sockets 26 extending over guide rollers 27 on the sections 3 of the frame bars, then over guide rollers 28 on the bars 22, and around guide rollers 29 on the ends of such bars, the opposite terminal of each trip cord passing over a roller 31 on the opposite bar 22 and passing through a fixed guide 32 and terminating in a rod 33 having a head 34 between which and the guide 32 is a spring 35, tending to maintain the particular trip cord under tension. The free ends of the trip cords, that is, the ends having the terminal sockets 26, are releasably held by rods 36, projecting from trip levers 37 later described. The gripping members are normally held in spaced relation to tension the trip cords with the respective blocks arranged immediately adjacent the plates 6 of the fender frame. The gripping members are adapted, when released, to be moved toward each other through the medium of springs 38, 39. These springs are connected preferably to the respective projections 16 of the blocks 15, and to the sections 3 of the supporting plates, opposing ends of the respective springs being connected to eye members 40 on the supporting bar sections 3, and the opposite ends of such springs connected to the attaching members 41, illustrated more particularly in Fig. 8. These members extend through and are rigid with the blocks 15 and are terminally provided with a latching member 42 formed with a recess 43 and held in operative position by a leaf spring 44. These members 41 have their latching ends extended through openings 45 in the fender side plates 6, and the recesses 43 of the latches are engaged by the ends 46 of Z-shape latching levers 47 pivotally supported at 48 on the respective side plates. Obviously with the latching levers in operative position, the blocks of the gripping members will be held in spaced relation against the tension of the springs 38 and 39, operative movement of the latching levers releasing the gripping members to the influence of the springs. A spring 49 is terminally connected at 50 to the respective projections 16 of the blocks 15 to assist in a positive action of the parts. A rod 51 extends through the hollow shaft 14 carried by the blocks 15, and on the terminals of this rod are mounted the trip levers 37 hereinbefore referred to. These levers are of right angle form, with the short leg connected to the latching lever 47, while the long leg carries the rod 36, which is adapted to seat in the opening in the socket terminals of the trip cord, thus holding one end of the trip cords fixed in the structure. Carried by each side plate 6 of the fender frame is a releasing member 52, Fig. 12, the end of which in advance of the side plate is turned downwardly and pivotally supports at 53 a releasing section 54 terminating in a releasing face 55 turned at right angles to its normal plane which slidably encircles the adjacent rod 36 immediately in rear of the socket 26, this releasing member tending as will later appear to force the socket off the rod to thereby release the opposing ends of the respective trip cords. The forward portion 54 of the fender which extends between the extreme forward ends of the bars 22 of the gripping members, is preferably of fabric which is formed to more or less house the trip cords which of course extend across the front of the structure from bar to bar.

Figure 1:
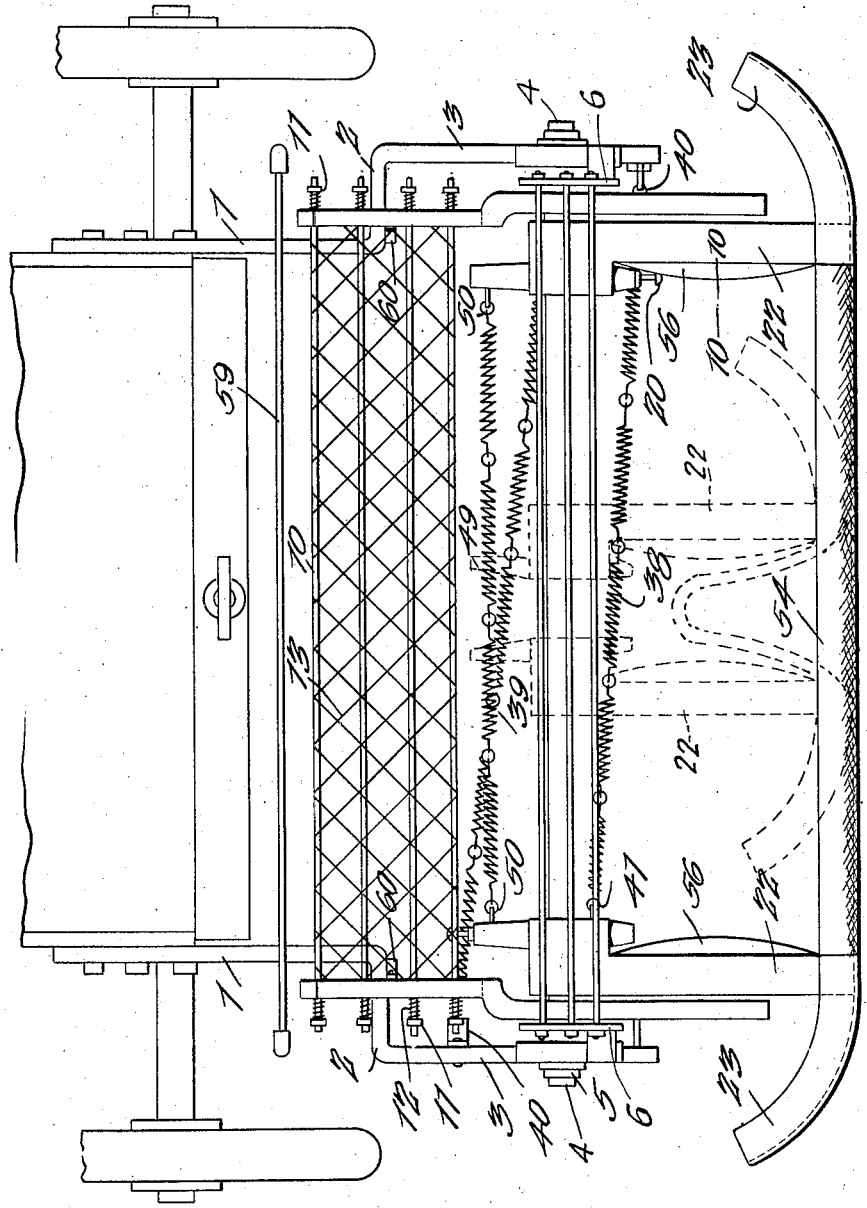
Fig. 1 is a plan view of the fender, showing the same in position in advance of the automobile.
Figure 2:
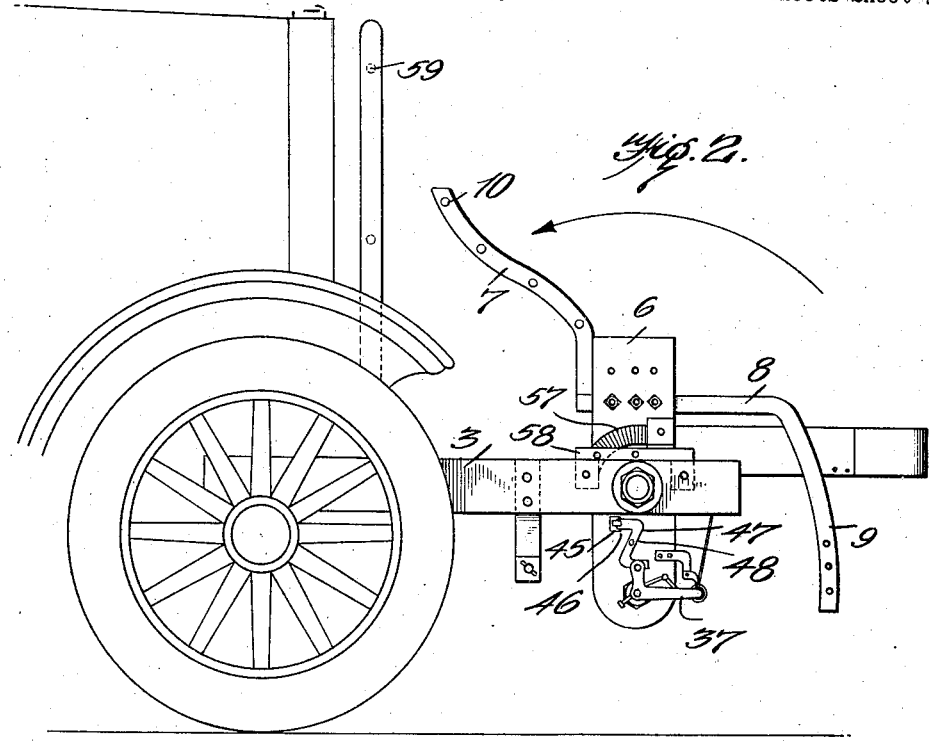
Fig. 2 is a side elevation of the same.
Figure 3:
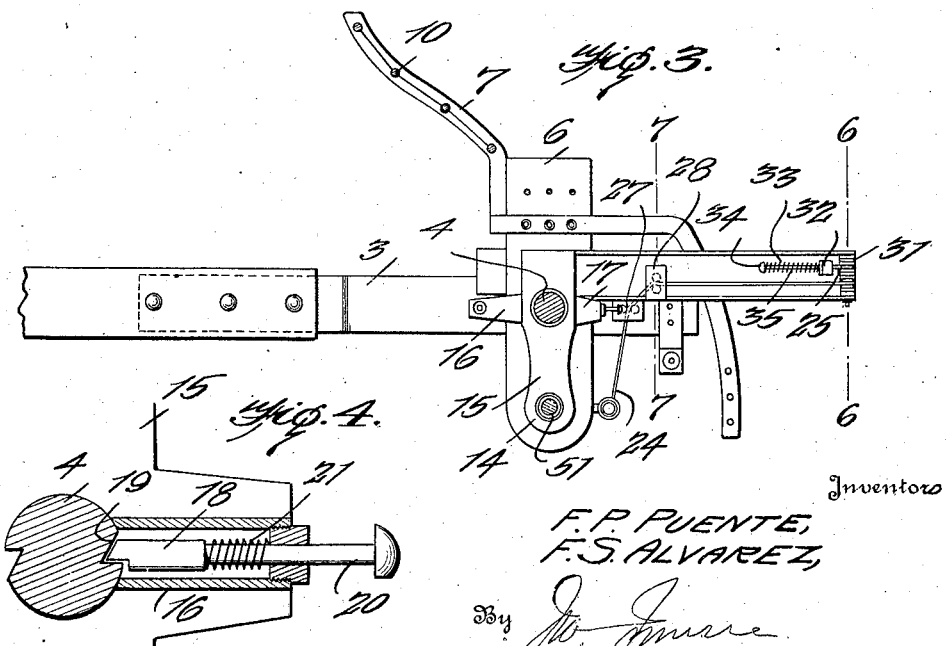
Fig. 3 is a transverse section of the same, the automobile structure being omitted.

Assuming the fender in proper receiving position, as indicated in Fig. 2, it will be understood that the dogs 18 are in cooperation with the teeth 19 of the shaft 3, and as these dogs are carried by tubular projections 16 of the gripping members it is apparent that this engagement of the dogs and fixed shaft 3 tend to prevent the fender from swinging downwardly and forwardly while not interfering with the rearward movement. The gripping members are extended against the tension of the springs 38 and 39 and held in such extended or spaced relation by reason of the latching levers 47 engaging the latch recesses 43 of the latches 42. If a person is struck by the fender between the bars 22 of the gripping members, the impact of his body will cause the fender to rock rearwardly on the shaft 4, and at the same time exert a pull on the respective trip cords. This result is obtained by reason of the fact that the part 54 of the fender which contacts with the body of the person struck is of fabric and will yield under the impact tending to exert a pull on the trip gears, which extend lengthwise the fabric section as indicated in dotted lines in Fig. 1. These trip cords acting initially on the trip levers 37, lock the latching levers 47 and release the gripping members. The springs act to move the gripping members toward each other to thereby grip the legs of the person and prevent him from being thrown off or dropped off the fender, particularly if he is in a daze or semi-conscious condition. It will of course be understood that as the gripping members 22 move toward each other under the influence of the springs 38, 39, the fabric portion 54 of the fender simply collapses into a depending fold and does not interfere with the gripping operation of the gripping members. As the fender rocks on the shaft 4, the releasing member 55 moves outwardly and upwardly with the effect to release the connected ends of the trip cords, thus clearing the obstruction otherwise provided by such cords. The operation described while referred to as in a series of steps is practically a simultaneous operation, so that the person struck is received and held on the fender until the automobile or other vehicle can be stopped.

To prevent possible injury through the contact of the gripping members, the latter, or more particularly the bars 22 thereof, are provided on the inner side with spring pressed cushions 56, as shown in Fig. 10, to cushion the impact incident to the rigid movement of the gripping members toward each other.

As the fender is swung rearwardly on the shaft 4 incident to the impact of the object, it is preferably locked at such rearward inclination through the provision of a ratchet bar 57 formed on the side plates 6, with which cooperates a pawl 58 secured to the section 3 of the supporting bar 1.

From the above description, it will be apparent that the improved fender operates to automatically pick up and support an object struck and to grip that object automatically during the pick up operation to insure that the object will not be thrown or fall from the fender. If desired, an auxiliary screen 59 may be supported in rear of the fender proper and between the fender and radiator of the automobile as an additional guard, and it is also preferred to provide stops 60 secured to the supporting bars to limit the rearward movement of the fender.

What we claim as new, is:

1. In combination with an automobile, of a fender including a support fixed to the automobile, a fender frame mounted for rocking movement on said support, gripping members movable transversely of the frame, springs for compelling gripping movement of said members, means for holding the gripping members in spaced relation, and trip cords carried by the frame and adapted under an object impact to release the holding means for the gripping members.

2. In combination with an automobile a fender including a supporting structure having a shaft, a fender frame mounted for rocking movement on said shaft, gripping members slidably mounted on said shaft, springs intermediate the gripping members and fender support to compel movement of the gripping members toward each other when free to act, latching means for holding the gripping members in spaced relation against the influence of the springs, trip cords subjected to endwise movement under object impact, and means between the trip cord and latching means to release the latter in the endwise movement of the tripping cords.

3. In combination with an automobile of a fender including a fixed support having a shaft, a fender frame capable of rocking on the shaft, gripping members slidable longitudinally on the shaft and having forwardly projecting arms, a flexible section extending between the arms to complete the forward edge of the fender, trip cords extending between and beyond the arms, means carried by each arm for yieldingly connecting one end of each trip cord, means carried by the fender frame for detachably connecting the opposite end of each trip cord, springs for compelling the gripping members to move toward each other when free to act, and means operatively controlled by the trip cords for normally holding the gripping members in spaced relation against the tension of said springs.

4. In combination with an automobile, of a fender including a fixed support having a shaft, a fender frame capable of rocking on the shaft, gripping members slidable longitudinally on the shaft and having forwardly projecting arms, a flexible section extending between the arms to complete the forward edge of the fender, trip cords extending between and beyond the arms, means carried by each arm for yieldingly connecting one end of each trip cord, means carried by the fender frame for detachably connecting the opposite end of each trip cord, springs for compelling the gripping members to move toward each other when free to act, and means operatively controlled by the trip cords for normally holding the gripping members in spaced relation against the tension of said springs, said means releasing the gripping members simultaneously with the release of the detachably connected ends of the trip cords.

5. A fender including a supporting shaft, a fender frame mounted for rocking movement on the shaft and including side plates, a hollow shaft connecting the side plates below the supporting shaft, gripping members slidably supported on said supporting shaft and hollow shaft, springs operating to move the gripping members toward each other when free to act, latching means for holding the gripping members in spaced relation against the tension of the springs, and yielding means adapted under object impact to release the latching members.

6. A fender including a supporting shaft, a fender frame mounted for rocking movement on the shaft and including side plates, a hollow shaft connecting the side plates below the supporting shaft, gripping members slidably supported on said supporting shaft and hollow shaft, springs operating to move the gripping members toward each other when free to act, latching means for holding the gripping members in spaced relation against the tension of the springs, trip cords adapted to receive the impact of the object, and levers intermediate one end of each of said cords and the latching means and operative under object impact to release the latching means.

7. A fender including a supporting shaft, a fender frame mounted for rocking movement on the shaft and including side plates, a hollow shaft connecting the side plates below the supporting shaft, gripping members slidably supported on said supporting shaft and hollow shaft, springs operating to move the gripping members toward each other when free to act, latching means for holding the gripping members in spaced relation against the tension of the springs, trip cords adapted to receive the impact of the object, and levers intermediate one end of each of said cords and the latching means and operative under object impact to release the latching means, and means operative in the rocking movement of the fender frame to disconnect the trip cords from said levers.

In testimony whereof we affix our signatures.

FÉLIX PUENTE y PUENTE. [L. S.]
FABIÁN SABUGO ALVAREZ. [L. S.]